Patented June 1, 1937

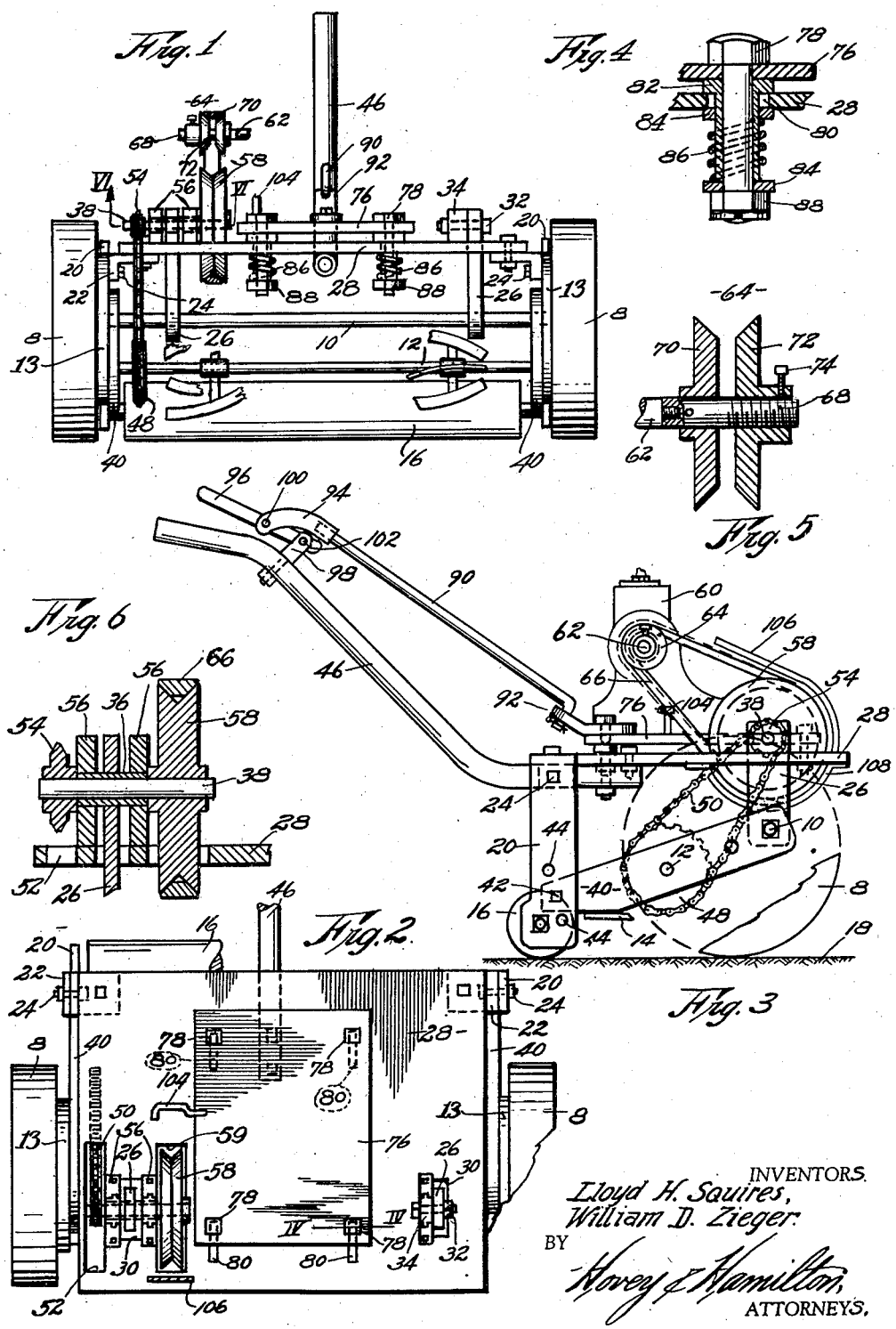

2,082,600

UNITED STATES PATENT OFFICE 2,082,600

POWER MOWER

Lloyd H. Squires and William D. Zieger, Olathe, Kans.

Application June 15, 1936, Serial No. 85,342

5 Claims. (Cl. 56—26)

This invention relates to mowing machines of the power type and has for its primary object, the provision of such an implement, wherein is incorporated a bodily shiftable power unit which renders effective or ineffective, as the case may be, the connecting means between the power unit and the propelling and cutting mechanism of the mower.

Another object of this invention is the provision in a power mower, of means for bodily shifting an engine or other source of power which renders the engine operable or inoperable, depending upon its position.

A still further object of the invention is to provide simple, effective and positive means of transmitting power to the cutting mechanism of a mower, which means may be rendered operative or inoperative, as desired, by controls suitably situated for manual manipulation by the operator of the power mower.

A yet further object of this invention is the provision of novel structure in a power mower that may be adjusted to alter the cutting height of the cutting mechanism without altering the level of certain parts of the mower, upon which is mounted the engine, and further without affecting the position of the handle that is utilized by the operator in guiding the mower during work.

A large number of minor objects of this invention will appear during the course of the following specification, referring to the accompanying drawing, wherein:

Fig. 1 is a front elevation of a power mower embodying this invention, but with the engine and part of the means for shifting the same not shown.

Fig. 2 is a top plan view of the mower illustrated in Fig. 1.

Fig. 3 is an end elevation of the same.

Fig. 4 is an enlarged, fragmentary, detailed sectional view, taken on line IV—IV of Fig. 2.

Fig. 5 is an enlarged, detailed, sectional view through the adjustable pulley of the engine, and, Fig. 6 is another enlarged, detailed, sectional view, taken along line VI—VI of Fig. 1.

The embodiment of the invention exemplified in the accompanying drawing indicates but one manner of commercially employing the features contemplated, and the power mower illustrated may be considered a typical assembly. The machine comprises a pair of opposed traction wheels 8, held in spaced relation and in operative position by conventional type frame work which includes the tie rod 10 and cutter reel shaft 12 that usually has mounted thereon the spirally formed, revoluble blades that engage stationary blade 14 to produce a shearing action to the end that a mowing operation will result.

A ground roller 16 is rotatably carried on an axis parallel to and spaced from the axis of rotation of wheels 8 and, as illustrated in Fig. 3, traction wheels 8 and ground roller 16 move along the supporting surface 18 when the mower is in use. A support 20 is at each end of roller 16 and extends upwardly therefrom for engagement with a bracket 22 which is bolted to the upper end of support 20 as at 24.

Another pair of supports 26 is provided to co-operate with supports 20 in carrying a platform 28. These supports 26 are mounted upon the rod 10 and extend through openings 30 formed in platform 28 so that the upper ends thereof may be bolted as at 32 to a bearing 34 in the case of one of supports 26, and engaged by sleeve 36 on shaft 38 in the case of the other support 26. From the immediate foregoing, it is clear that platform 28 is mounted on four supports and that the connections between platform 28 and the various supports are such as to permit adjustment for the hereinafter mentioned purpose.

A pair of links 40 interconnect supports 26 and supports 20. One end of links 40 are in engagement with tie rod 10 and the other ends thereof are adjustably attached to supports 20 by a bolt 42. A series of holes 44 formed through supports 20 permits raising and lowering of the end of links 40 so as to raise and lower the cutting mechanism of the mower which is mounted upon shaft 12, journalled in said links 40 intermediate the ends thereof. When the adjustable ends of links 40 are moved, the distance between the supporting surface 18 and the cutting mechanism is altered to suit conditions. Because of the manner of attaching together supports 20 and 26 and platform 28, and said supports and links 40, the level of platform 28 will not be affected nor will the position of handle 46 be changed when the aforesaid adjustment takes place. Tie rod 10 is carried by the side plates 13 of traction wheels 8, as is the case in most mowers of this type.

Cutter reel shaft 12 has a sprocket 48 mounted thereon and the ends of shaft 12 are geared to wheels 8 in the conventional manner so that when power is transmitted to sprocket 48 through chain 50 the cutting mechanism is positively operated and the mower is propelled. Chain 50 extends upwardly through an opening 52 provided in platform 28 so that it may pass over sprocket pinion 54 mounted upon shaft 38, journalled in bearings 56 mounted on platform 28. Sleeve 36 precludes localized wearing by support 26 and a pulley 58 is secured to shaft 38. Pulley 58 extends below platform 28 through opening 59 provided for the purpose.

An engine or other suitable portable transportable source of power 60, having a shaft 62, is supported on the mower in a special manner. Shaft 62 has a pulley 64 mounted thereon and belt 66 passes over pulleys 58 and 64. Thus when belt 66 is tight enough to receive power from engine 60, it will drive pulley 58 and, by virtue of the aforementioned structure, will actuate the cutting mechanism and propel the mower.

Belt 66 is of a relatively stiff, V-type character and pulley 64 is constructed as detailed in Fig. 5 so that the speed ratio may be altered. This pulley 64 is attached to engine shaft 62 by first being mounted upon a threaded auxiliary shaft 68 that is attached in any suitable manner to shaft 62. One half 70 of pulley 64 is pinned to auxiliary shaft 68 and the other half 72 is in screwthreaded engagement with the threads of shaft 68. A set screw 74 secures this half 72 in the desired adjusted position with respect to half 70 and the distance apart of halves 70 and 72 will determine the effective diameter of the pulley.

Engine 60 is shiftable bodily, and to carry out this point of the invention, the same is mounted upon a plate 76, slidably carried by platform 28 by structure detailed in Fig. 4. Bolts 78 pass through slots 80 provided in platform 28 and a flanged sleeve 82 serves to space apart platform 28 and plate 76. Washers 84 have a coil spring 86 therebetween and said spring exerts a yielding force to maintain plate 76 in position.

This plate 76 may be shifted forward and back and the distance of shifting is determined by slots 80. Means for so shifting plate 76 and engine 60 is illustrated in Fig. 3, and may comprise a rod 90, secured to plate 76 by fixture 92 at its one end and attached to clevis 94 at its other end. This clevis is pivotally connected to a lever 96 intermediate its ends and one end of lever 96 is swingably attached by member 98 to handle 46. The "past center" relation between pins 100 and 102 creates a lock which holds plate 76 at one end of its path of travel so that belt 66 is in tight frictional engagement with both pulleys 64 and 58 so that the power mower may be operated. When plate 76, and therefore engine 60, is bodily shifted forwardly by manipulating lever 96, the distance between the axes of rotation of pulleys 64 and 58 will be decreased and therefore belt 66 will not function.

A standard 104 on plate 76 engages one stretch of belt 66 and a shield 106 mounted on platform 28 engages the other stretch thereof and assists another shield 108 in holding one bight of belt 66 against pulley 58. Obviously, when engine 60 is shifted forwardly, driving force will not be transmitted.

The structures mentioned are not only desirable from the standpoint of presenting an efficient power mower, but are valuable in protecting the power mower when in use. Belt 66 will slip sufficiently when the cutting mechanism or wheels 8 meet with some obstruction and injury to the machine is thereby prevented.

It is conceivable that machines of a nature other than that illustrated and described might be made to embody this invention, and while a typical mower has been illustrated and detailed, it is understood that modifications and changes might be made without departing from the spirit of the invention or scope of the appended claims.

Having thus described the invention, what is claimed as new and desired to be secured by Letters Patent is:

1. In a power mower having traction wheels, and cutting mechanism, the combination of a platform supported by the wheels and provided with an opening therethrough; an engine shiftably supported on top of the platform; means operably connecting the cutting mechanism, traction wheels and engine to drive the mechanism and propel the mower; and manually operable means for bodily shifting the engine to render effective or ineffective the said connecting means, said connecting means comprising a pulley on the engine, a pulley rotatably carried by the platform and extending above and below the platform within the opening provided therein, and a chain drive joining the pulley on the platform and said cutting mechanism.

2. In a power mower having traction wheels and cutting mechanism, the combination of a platform supported by the wheels; an engine movably mounted on the platform having a pulley; a shaft journalled for rotation on the platform; a pulley and sprocket pinion on the shaft; a sprocket wheel on the cutting mechanism; a chain passing over the sprocket pinion and sprocket wheel to positively drive the cutting mechanism; an endless belt passing over the said engine pulley and pulley on the shaft; and means for bodily shifting the engine to render the said belt ineffective for transmitting power from the engine to said shaft.

3. In a power mower having traction wheels and cutting mechanism, the combination of a platform supported by the wheels; an engine movably mounted on the platform having a pulley; a shaft journalled for rotation on the platform; a pulley and sprocket pinion on the shaft; a sprocket wheel on the cutting mechanism; a chain passing over the sprocket pinion and sprocket wheel; an endless belt passing over the said engine pulley and pulley on the shaft; and means for bodily moving the engine toward and from the said pulley on the shaft to decrease and increase the distance between said pulleys whereby to render the belt ineffective or effective respectively.

4. In a power mower having traction wheels and cutting mechanism, the combination of a platform supported by the wheels; an engine movably mounted on the platform having a pulley; a shaft journalled for rotation on the platform; a pulley and sprocket pinion on the shaft; a sprocket wheel on the cutting mechanism; a chain passing over the sprocket pinion and sprocket wheel; an endless belt passing over the said engine pulley and pulley on the shaft; means for bodily moving the engine toward and from the said pulley on the shaft to decrease and increase the distance between said pulleys whereby to render the belt ineffective or effective respectively; and members maintaining the belt out of engagement with the engine pulley when said pulleys are the shortest distance apart.

5. In a power mower of the character described a pair of opposed wheels; a platform carried by the wheels; a support depending from the platform on each side thereof rearwardly of the wheels; a ground roller carried by the supports at the lower ends thereof; a second support depending from each side of the platform forwardly of the first mentioned supports; a link connecting the lower ends of two of the supports at each side of the platform; a cutter reel journalled in the links between the supports and having driving connection with the said wheels; and a blade on the links to co-operate with the cutter reel, one end of the links being pivotally connected to the second mentioned supports, the other ends thereof being adjustably joined to the first mentioned supports whereby upon adjustment of the said other ends the cutter reel and coacting blade are moved toward and from the supporting ground surface.

LLOYD H. SQUIRES.
WILLIAM D. ZIEGER.